F. WRIGHT.
STORAGE BATTERY.
APPLICATION FILED JAN. 9, 1914. RENEWED FEB. 6, 1918.
1,279,508. Patented Sept. 24, 1918.
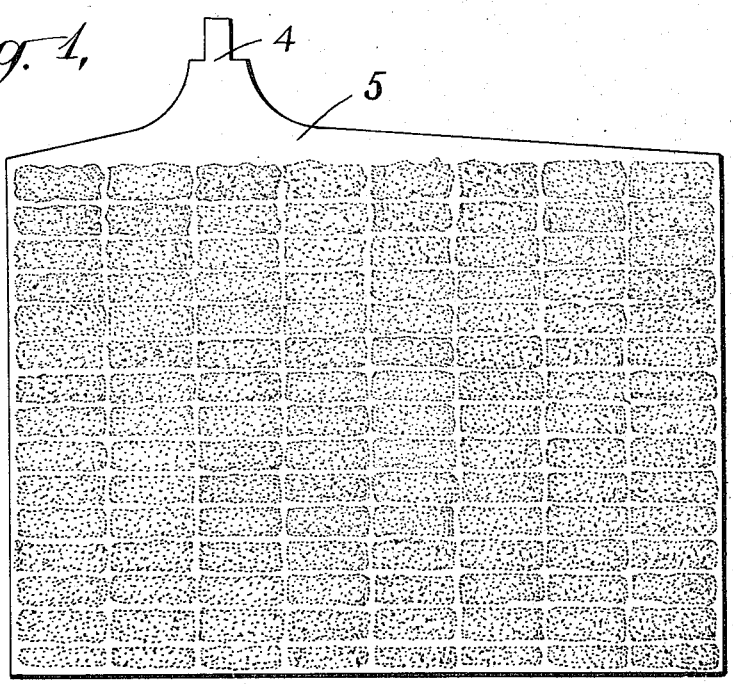
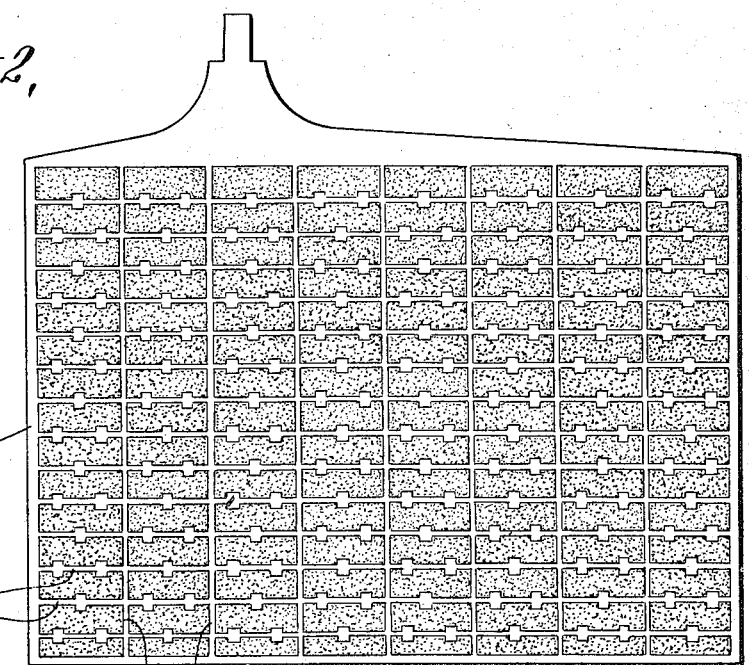
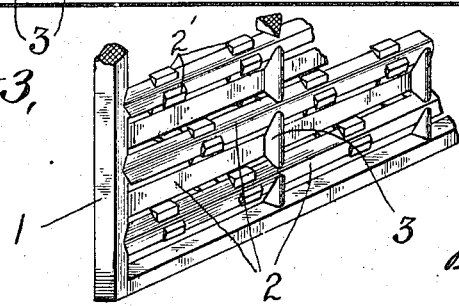
WITNESSES
INVENTOR
Frederick Wright.
BY
ATTORNEYS

UNITED STATES PATENT OFFICE.

FREDERICK WRIGHT, OF POUGHKEEPSIE, NEW YORK, ASSIGNOR, BY MESNE ASSIGNMENTS, TO WRIGHT STORAGE BATTERY COMPANY, OF POUGHKEEPSIE, NEW YORK, A CORPORATION OF NEW YORK.

STORAGE BATTERY.

1,279,508.  Specification of Letters Patent.  Patented Sept. 24, 1918.

Application filed January 9, 1914, Serial No. 811,150. Renewed February 6, 1918. Serial No. 215,731.

*To all whom it may concern:*

Be it known that I, FREDERICK WRIGHT, a citizen of the United States, residing at Poughkeepsie, county of Dutchess, State of New York, have invented certain new and useful Improvements in Storage Batteries; and I do hereby declare the following to be a full, clear, and exact description of the invention, such as will enable others skilled in the art to which it appertains, to make and use the same.

It is an object of the present invention to provide a storage battery of the lead sulfuric acid type wherein a high weight efficiency is attained, and a high discharge rate is possible; and it is particularly an object of the present invention to provide electrodes substantially free from shedding and sulfating, and particularly adapted for mounting close together.

To obtain the above enumerated and other objects arising from the improvements here disclosed, the active material used for pasting the grids is compounded in special manner and before the forming treatment is subjected to the burning or strengthening action of concentrated sulfuric acid which is painted on in small quantity and produces a marked change in the active material and special beneficial effects as hereinafter recited, and in addition to this the plates after forming are subjected to a surface treatment whereby dead or rotten material is removed from the faces of each plate, leaving the plates clean and firm, with their active material directly exposed to the electrolyte and in best condition and position for efficient operation at high discharge rates. This surface treatment which need be nothing more than a milling operation for the removal of a layer of about one sixty-fourth (1/64) of an inch thick has a marked influence on the tendency of the plates to shed or sulfate, and practically eliminates both of these factors.

The details of the invention and special objects and advantages are made clear by the following detailed description, which is to be taken in conjunction with the accompanying drawings, wherein—

Figure 1 is a side view of a plate after forming, and before removal of the surface layer;

Fig. 2 is a view of the same plate after removal of the surface layer, and

Fig. 3 is a perspective view of a corner of one of the grids before it is filled in with the active material paste.

The grids used by me are preferably of lead-antimony with about 5% antimony and may be cast with pressure or without, as desired. Each grid, as indicated in Fig. 3, comprises a frame 1 sub-divided into sections by vertical ribs 3 (Fig. 2). Extending across the frame and the vertical ribs are two groups of transverse retaining bars 2 each of triangular cross-section with the flat side of the triangle facing inward and the apex of the triangle facing outward and rising slightly above the outer edge of the intersected vertical ribs 3. The bars 2 of the series on one side of the grid are staggered with respect to those on the other side of the grid to form recesses or pockets for the reception of the active material. Small lugs 2' may be cast integral with these bars 2 about in the relation indicated in Figs. 2 and 3, and the material of these lugs may even extend through from one triangular bar to its opposing bar, thereby bracing the bars between the vertical ribs 3 and also assisting in the retention of the active material within the pockets formed by the triangular bars. This configuration of grid is satisfactory, but other shapes may be used. Preferably the frame at the top of the grid is cut at an angle, as shown in Fig. 1, so that between the terminal 4 at which the grid is burned into its connector, there extends a tapering strip of lead 5 of a cross section proportional to the amount of current which is to be carried at any particular point along its length.

The active material for the positive plate is made up of equal parts by weight of "battery lead" and "red lead." "Battery lead" is a standard article on the market, and may be purchased under that name from the National Lead Company. It consists largely of true red lead, and according to analyses furnished by manufacturers is a composition substantially as follows: true red lead 80%; litharge 19%, insoluble material, such as silica, iron and silver, 1%. The "red lead" with which this "battery lead" is mixed in equal parts by weight, may be of the following composition: true red lead 88%; litharge 11%, insoluble material such as silica, iron and silver, 1%.

The mixture of "battery lead" and "red lead" is moistened with dilute sulfuric acid of about specific gravity of 1.250, until it is in the condition of a stiff paste and this paste is then worked into the grids to fill the recesses or pockets. This pasting operation may be performed by hand, the paste of active material being worked into the pockets by means of a trowel.

The active mixture for the negative plate preferably consists of "battery lead" alone, wet with dilute acid, and put into the pockets or recesses as above recited.

After the grids are filled with active material, they are laid aside and allowed to dry. Preferably, this drying is carried on at room temperature, the plates being exposed to free circulation of air until they look dry. This ordinarily takes from two days to a week, depending somewhat on atmospheric conditions.

The next step in the production of the battery is an important one, and consists in painting the pasted plates with concentrated sulfuric acid. The operation is carried out with commercially concentrated sulfuric acid which has a specific gravity of about 1.78 (66° Baumé). This acid may be applied with a bristle brush, say one and one-half inches wide, and is put on quickly, the brush being merely dipped in the acid and wiped back and forth across the plate until all parts of the surface have been wet with the strong acid. Ordinarily, the brush is not passed more than once over any particular portion of the plate area. The concentrated acid soaks into the dry plates very quickly, apparently penetrating to all parts of the active material, but certainly having a very great effect on the outermost parts. The acid seems to burn or densify the active material, and without speculating as to the chemical or molecular changes which may have been brought about, it is sufficient to here recite some of the apparent physical effects. The plates, immediately on painting with the strong acid, turn to a dark Indian brown, though this color disappears in part when the plates are again dried. A surface hardening is produced and the active material becomes densified into a solid cake. The plates ring like metal when struck a blow and electrically they are much better conductors than before the painting with acid. Also, when the plates are subjected to the subsequent forming treatment, the beneficial effects of the painting are readily apparent, the plates forming more quickly and more completely, and apparently affording better conductivity to the flow of current, particularly at the earlier stages of the forming operation. In general, it has been my experience that plates so painted can be "formed" in three-quarters or possibly one-half the time, or in other words, with about half the energy necessary if they are not so painted.

After the painting operation, the plates dry quickly, and are then ready for forming. For this step, the plates are temporarily "burned" to terminals and placed in jars with rubber separators between, and there charged for several hours at a current of about 40% of the normal eight hour rate for the particular plates under treatment, and in sulfuric acid of a specific gravity of about 1.15, and after this has continued for, say, three hours, the charging rate is increased to 80% of the normal eight hour rate until the voltage at this rate is 2.5 volts per cell. The cells are then discharged at 80% of the normal eight hour rate until the voltage per cells drops to 1.67. Ordinarily, one charge and discharge is sufficient to completely form the plates, though the treatment may be repeated two or three times if such procedure in any particular case be necessary or desirable. The formed plates are then taken out of the acid and washed in water and dried in air. They are then of the general appearance indicated in Fig. 1, the active material having swollen somewhat and bulging from the pockets a very little and presenting a somewhat uneven surface and a somewhat uneven outline for the supporting grid. The plates are then ready for the next and very important step, whereby a thin surface layer is removed from both sides of the plate, and the plate is in large measure insured against subsequent shedding and sulfating.

The removal of the surface layer may be conveniently effected in a milling machine. The formed plate is clamped to a flat surface and a broad milling cutter removes a layer about one-sixty-fourth (1/64) of an inch thick. The material so removed includes the dead or rotten surface layer of the active material and also takes a little from the face of the grid, leaving the grid sharply defined, as indicated in Fig. 2, and clean on the exposed areas, and of uniform thickness throughout. This surface trimming of dead or inactive material contributes largely to a high weight efficiency and permits the plates to be mounted very close together, thereby decreasing the internal resistance of the battery when in normal use, and contributing to a high rate of discharge.

After the trimming or surfacing operation, the plates are assembled and burned into their terminal connectors and are equipped with wood separators of suitable character, and then assembled in jars of ordinary construction and provided with fresh sulfuric acid of a specific gravity of 1.150. They are then charged at normal rate, or a little above, until the acid reaches a specific gravity of 1.29 to 1.31, which may be in about twelve hours at the normal rate. Ordinarily this charging operation need not be repeated, but the battery will be ready for use after the first charging. On open circuit, the voltage for a group of three cells should be about six and one-half volts, and the discharge rate, while varying, of course, with the size of the plates, is relatively high in comparison with other lead batteries of comparable weight and cost.

It is a particular characteristic of the batteries here disclosed that after operating for a long time, even at very high rates of discharge, there will be found in the bottom of the cell very little mud or other evidence of shedding or disintegration of the plates, and the plates themselves will be substantially free from injurious "sulfating." These characteristics I attribute very largely to the trimming operation which follows the forming, and whereby the dead or exhausted surface layer is removed entirely from the plates and does not remain to give trouble later on, though some of the beneficial effects above stated are to be attributed to the densifying action of the painting with concentrated sulfuric acid, preliminary to forming.

I claim:

1. The method of treating a lead storage battery plate after pasting and before forming, which consists in painting it lightly with concentrated sulfuric acid to densify the active material and facilitate the subsequent forming operation.

2. The method of treating a lead storage battery plate after pasting and before forming, which consists in thoroughly drying the pasted plate and then subjecting it to the densifying action of sulfuric acid of about specific gravity 1.78 applied in small quantity to the face of the plate and allowed to penetrate into the interior.

3. The method of densifying a pasted lead storage battery plate, which consists in quickly brushing it over with sulfuric acid of about specific gravity 1.78.

4. The method of making a lead storage battery plate, which consists in pasting the grid with a mixture of equal parts by weight of battery lead and red lead moistened with dilute sulfuric acid, then drying the pasted plates at room temperature and before forming the same painting them over lightly with but a small quantity of concentrated sulfuric acid to densify and harden the active material and facilitate the forming treatment.

5. A step in the manufacture of lead storage battery plates, which consists in the mechanical removal of the surface layer of the active material and of the grid after electrolytic forming and before assembly of the plate in a battery.

6. The method of treating an electrolytically formed battery plate to reduce shedding and sulfating, which consists in mechanically removing a layer of material about one sixty-fourth of an inch thick from both sides of the plate, thereby removing the dead or inactive material of the grid and its filling and leaving a compact dense and uniform plate free from loosely supported surface material.

7. The method of making lead storage battery plates which consists in pasting the grids with a mixture of battery lead and red lead moistened with dilute sulfuric acid, drying gradually, painting with concentrated sulfuric acid to densify the active material, forming electrolytically with current and then milling away the dead or inactive material from the surface of the grid to a depth of about one-sixty-fourth of an inch.

In testimony whereof I affix my signature, in presence of two witnesses.

FREDERICK WRIGHT.

Witnesses:
ALFRED BOLOGNESI,
S. BLIDE.